United States Patent [19]

Blatchford

[11] 4,219,122
[45] Aug. 26, 1980

[54] VEHICLE-MOUNTED CRANE ASSEMBLY

[76] Inventor: Michael I. Blatchford, The Grange, Midsomer Norton, England

[21] Appl. No.: 886,131

[22] Filed: Mar. 13, 1978

Related U.S. Application Data

[63] Continuation-in-part of Ser. No. 661,022, Feb. 24, 1976, abandoned.

[51] Int. Cl.² .............................................. B60P 1/54
[52] U.S. Cl. ..................................... 212/73; 212/125; 414/348; 414/542
[58] Field of Search ............... 414/341, 345, 541, 542, 414/544; 212/73, 125

[56] References Cited
FOREIGN PATENT DOCUMENTS 1531990  3/1970  Fed. Rep. of Germany ........... 414/542
1901656  9/1970  Fed. Rep. of Germany ........... 414/542

Primary Examiner—Robert G. Sheridan
Attorney, Agent, or Firm—Cushman, Darby & Cushman

[57] ABSTRACT

A vehicle-mounted crane assembly has an elongate bolster member extending transversely of the vehicle. An elongate extension member is hingedly mounted at one end of the bolster member for swinging movement from an operative horizontal position to an inoperative position in which the extension member is inclined upwardly from the hinge mounting at an angle which is more than 90° and up to 130° to the horizontal. The extension member is movable between its operative and inoperative positions by a hydraulic ram which is mounted by the extension member. The ram piston rod is connected to one end of an elongate link by a first pivotal connection. The other end of the link is connected to the bolster member by a second pivotal connection. The second pivotal connection is guided by elongate guide means, and during a first part of the swinging movement of the extension member, the link is in compression until the extension member has been raised to a position in which its weight causes a force reversal so that the elongate link is in tension during a second part of the swinging movement.

9 Claims, 7 Drawing Figures

VEHICLE-MOUNTED CRANE ASSEMBLY

This application is a continuation-in-part of my co-pending application Ser. No. 661,022 filed Feb. 24, 1976, now abandoned.

Field of the invention

This invention relates to a vehicle-mounted crane assembly. There is at the present time a need to render goods vehicles self-loading and unloading by mounting crane structures thereon but the provision of such structures on vehicles used for transporting I.S.O. containers and similar large loads raises considerable problems as these containers are generally constructed to the maximum dimensions permitted for such vehicles, usually 8 ft. high and 8 ft. wide, so that there is little space available laterally or vertically within which to accommodate a crane structure.

Summary of the invention

An object of the invention is to provide an improved crane structure for mounting on a vehicle used for transporting I.S.O. containers and other bulky, rigid loads, which structure is of relatively simple construction, easy to operate and which when not in use can be stowed on the vehicle without encroaching to any appreciable extent on the load carrying area, and without projecting beyond the permitted width and height of the vehicle.

According to the invention a vehicle-mounted crane assembly comprises: (i) a vehicle frame having a longitudinal axis; (ii) an elongate bolster member extending transversely to the vehicle frame and supported thereby; (iii) an elongate extension member; (iv) a hinge connection between the extension member and an end of the bolster member mounting the extension member for swinging movement in a plane transverse to the said longitudinal axis between a horizontal operative position aligned with the bolster member; and an inoperative upwardly inclined position in excess of 90° and up to 130° relative to the horizontal; (v) an adjustable leg structure carried by the outer end of the extension member for engagement with the ground when the extension member is in the horizontal operative position; (vi) a pedestal supported by the bolster member and mounted for traversing movement along the bolster member and along the extension member when the latter is in the horizontal operative position; (vii) lifting means supported by the pedestal for attachment to a load to be raised or lowered relative to the vehicle frame; (viii) a hydraulically-actuated linkage for swinging the extension member relative to the bolster member between the operative and inoperative positions of the extension member, wherein the linkage comprises: (a) an extendable, contractable hydraulic ram mounted by the extension member, the longitudinal axis of the ram extending lengthwise of the extension member, and the ram having a piston rod with a free end; (b) an elongate link having a first pivotal connection at one of its ends to the free end of the piston rod and having a second pivotal connection at the other of its ends to the bolster member for swinging of the link about a fixed axis; (c) elongate guide means mounted by the extension member for guiding the said first pivotal connection; and (d) whereby during a first part of the swinging movement of the extension member from the horizontal operative position to the inoperative upwardly inclined position, the elongate link is in compression until the extension member has been raised to a position in which its weight, during a second part of the swinging movement, causes a force reversal so that the elongate link is in tension.

Description of the preferred embodiment

Figure 1:
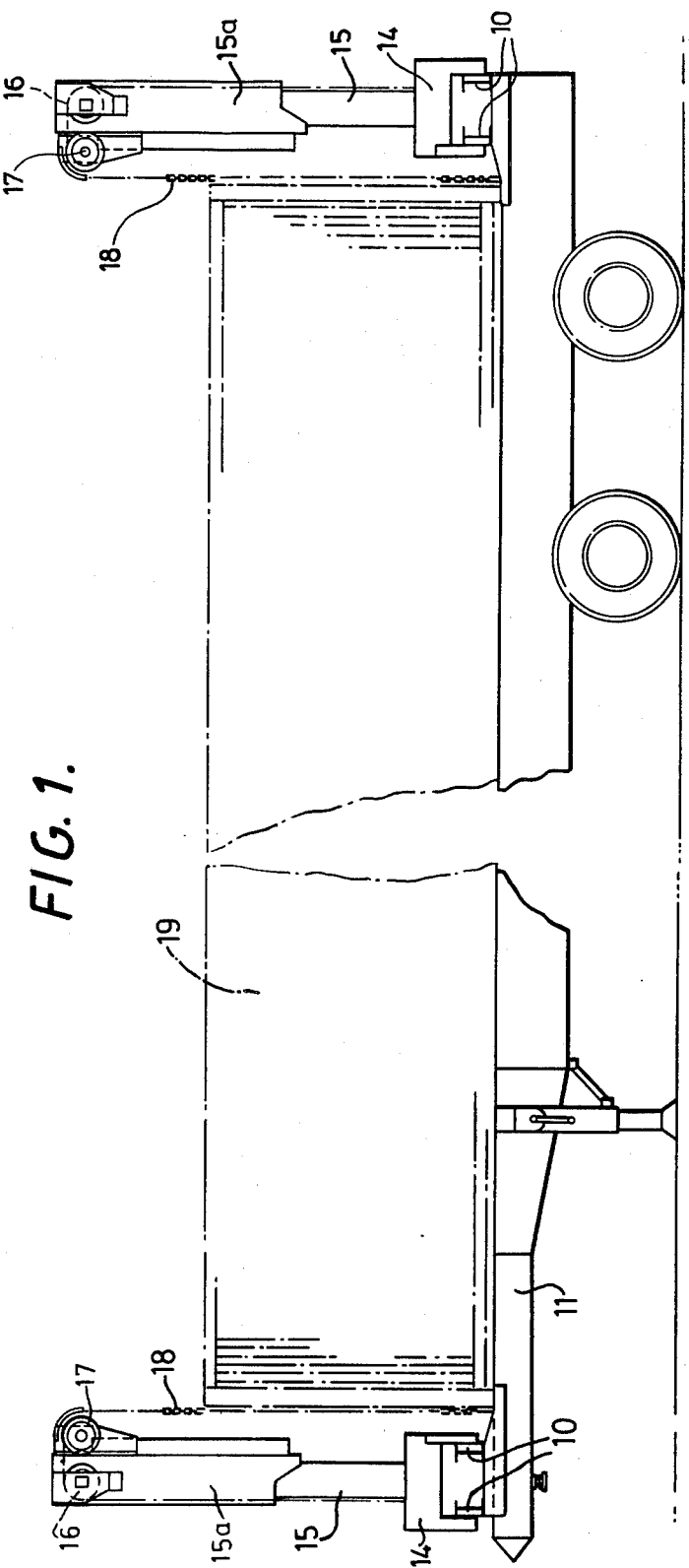
FIG. 1 is a side elevation of a vehicle showing a crane assembly in accordance with the invention mounted at each end thereof.
Figure 2:
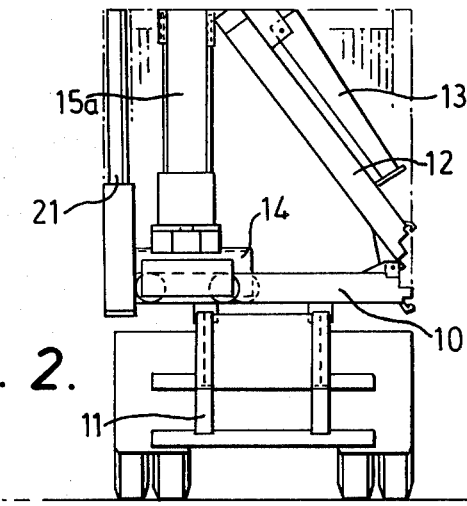
FIG. 2 is a rear end elevation of FIG. 1 with the extension member in the folded, inoperative, upwardly inclined position.
Figure 3:
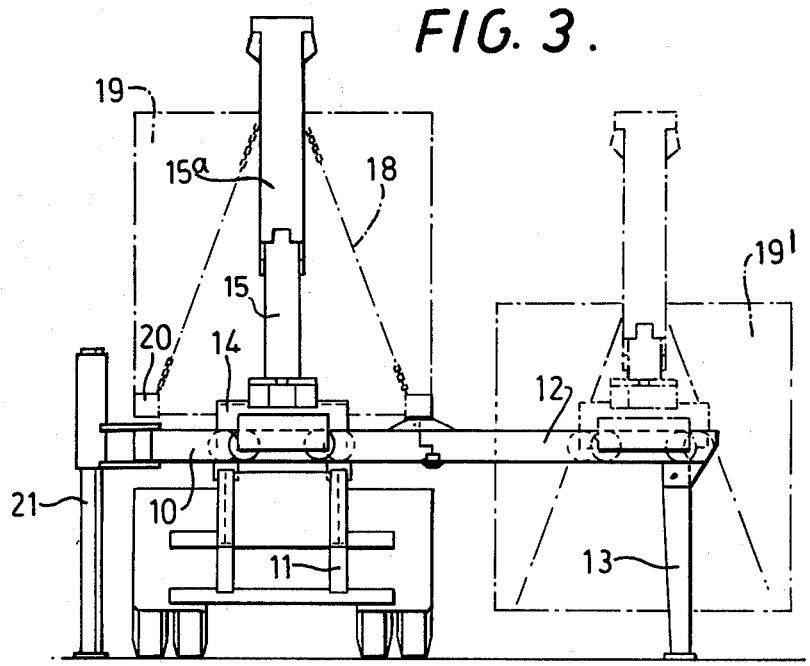
FIG. 3 is a rear end elevation of FIG. 1 showing the extension member in the operative horizontal position.

Referring firstly to FIGS. 1 to 3 there is shown a respective crane assembly mounted at each end of a vehicle, each assembly comprising an elongate bolster member 10, of a length corresponding to the width of the vehicle and extending across the vehicle. Each bolster member 10 comprises a pair of parallel H-section girders rigidly secured to the vehicle chassis 11. Hinged to one end of each bolster member for movement in a vertical plane is an elongate extension member 12 which is of such length that, when not in use and raised to the inoperative upwardly inclined position shown in FIG. 2, it does not extend beyond the maximum permitted height of the vehicle. To the outer end of the extension member 12 is attached a folding leg or strut 13 which, when the extension member 12 is lowered in its horizontal operative position, is folded down to engage the ground and support the extension member 12, which then forms a continuation of the bolster member 10, FIG. 3. It will be understood that the folding strut may be substituted by other adjustable structures such as a telescopic or other collapsible leg, or by a hydraulic jack. Mounted on wheels or rollers for movement along the bolster member 10 and the extension member 12, by hand or by hydraulic or other power actuation, is a carriage 14 supporting a vertical pedestal 15, 15a on the upper end of which are support pulleys 16, 17 around which passes a chain 18 connected at one end to a winch on the carriage 14 and which can be attached at the other end to a container 19 or other load, for example by engagement of hooks on the chain 18 with lifting lugs 20 at the bottom corners of the container 19. The working height of the pulleys 16, 17 is adjustable by forming the pedestal 15, 15a as a telescopic structure for extension and contraction, such lifting and lowering movements being effected by hydraulic mechanism, chain and pulley system or equivalent lifting gear incorporated in the pedestal and/or its supporting carriage.

In the construction shown in FIGS. 1 to 3 the supporting wheels or rollers at each side of the carriage 14 run between the top and bottom flanges of the rails 10 but as an alternative the rollers on the inner side of the carriage, that is nearest the load, could be mounted to run on the top of the inner rail thereby bringing the rollers nearer the load with a corresponding lowering of the load on the rollers.

It will be appreciated that a vehicle equipped with crane assemblies as above described is adapted for side loading and unloading. Thus to load a container on to the vehicle, the extension members 12 at both ends of the vehicle are lowered to the horizontal position and are there supported by their struts 13, and the two carriages and their pedestals are then traversed outwards onto the extension members which are positioned at opposite ends of the container to be loaded. The pedestals are adjusted to an appropriate working height and slings attached to the chains 18 are engaged with the ends of the container which is then raised to a height to clear the floor of the vehicle. The carriages and pedestals are then traversed inwards to bring the container above the floor of the vehicle, the container being then lowered thereon by operation of the pedestal lifting gears. With the container safely stowed on the vehicle the slings can be removed and the extension members, with their supporting struts collapsed, are then each swung upwards and inwards through an angle of approximately 130° from the horizontal operative position so that the crane assemblies are folded to the same end overall dimensions as an I.S.O. container. Unloading of the container from the vehicle is effected by a reverse set of operations.

It will be seen from FIG. 3 that when side loading and unloading, the bolster members 10 with their extension members 12 are supported at one end by the struts 13 and at the other end by the vehicle and to increase stability at this latter end, a retractible leg 21 is provided on that end of each fixed bolster member, this leg being hinged to the bolster member about a vertical hinge pin such that it can be swung to a forward or rearward position where it does not project beyond the overall width of the container or the vehicle.

The carriages 14 may be propelled along the tracks by providing in each carriage a hydraulic motor driving, through a reduction gear, a sprocket wheel which meshes with a taut chain extending along the inside of the bolster member, the chain being connected at one end to a winch and also serving to raise and lower the extension member. Suitable idlers may be provided to guide the chains into driving engagement with the sprocket wheels whereby when the motors are energised the carriages rack their way along the stationary chains. Preferably, the motors are connected in series into the driving hydraulic circuit such that fluid flows from one motor directly to and through the other motor whereby the motors operate in unison and the carriages are displaced at equal speeds. It will be understood however that rack and pinion or other forms of driving gear may be used if desired for moving the carriages.

Each extension member is swingable upwardly through an angle of more than 90° up to 130° to the horizontal, when being returned from its operative horizontal position to its inoperative upwardly inclined position. Such a movement is not readily obtained in a simple manner with known mechanisms and the present invention provides a hydraulically-actuated linkage to achieve this operation.

Figure 4:
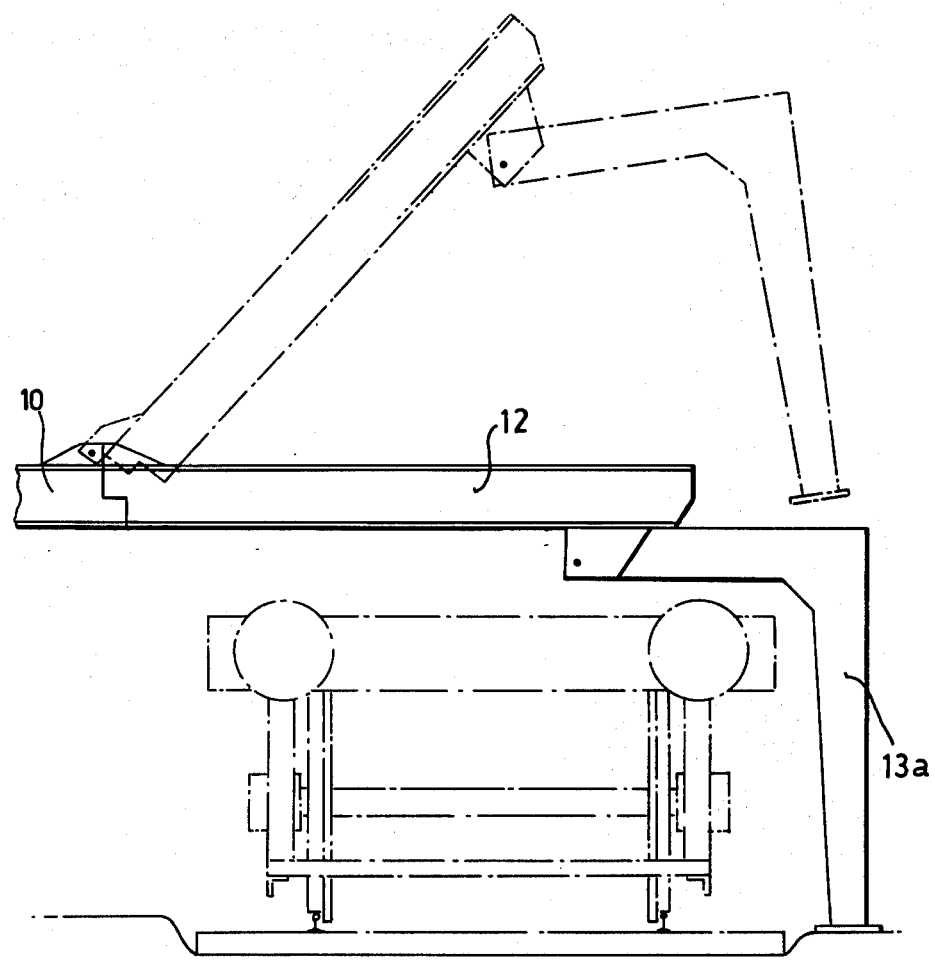
FIG. 4 is a diagrammatic, fragmentary rear end elevation of a modified embodiment.

FIG. 4 illustrates a modification of the construction of FIGS. 1 to 3, the folding leg or strut 13a in this instance being of right-angular form such that the effective length of the extension member 12 is increased so that it can span or straddle a truck or other vehicle and so permit a container or other load to be transferred directly from one vehicle to another. If desired, the horizontal limb of the strut may also be formed to allow the carriage 14 to run thereon.

Figure 5:
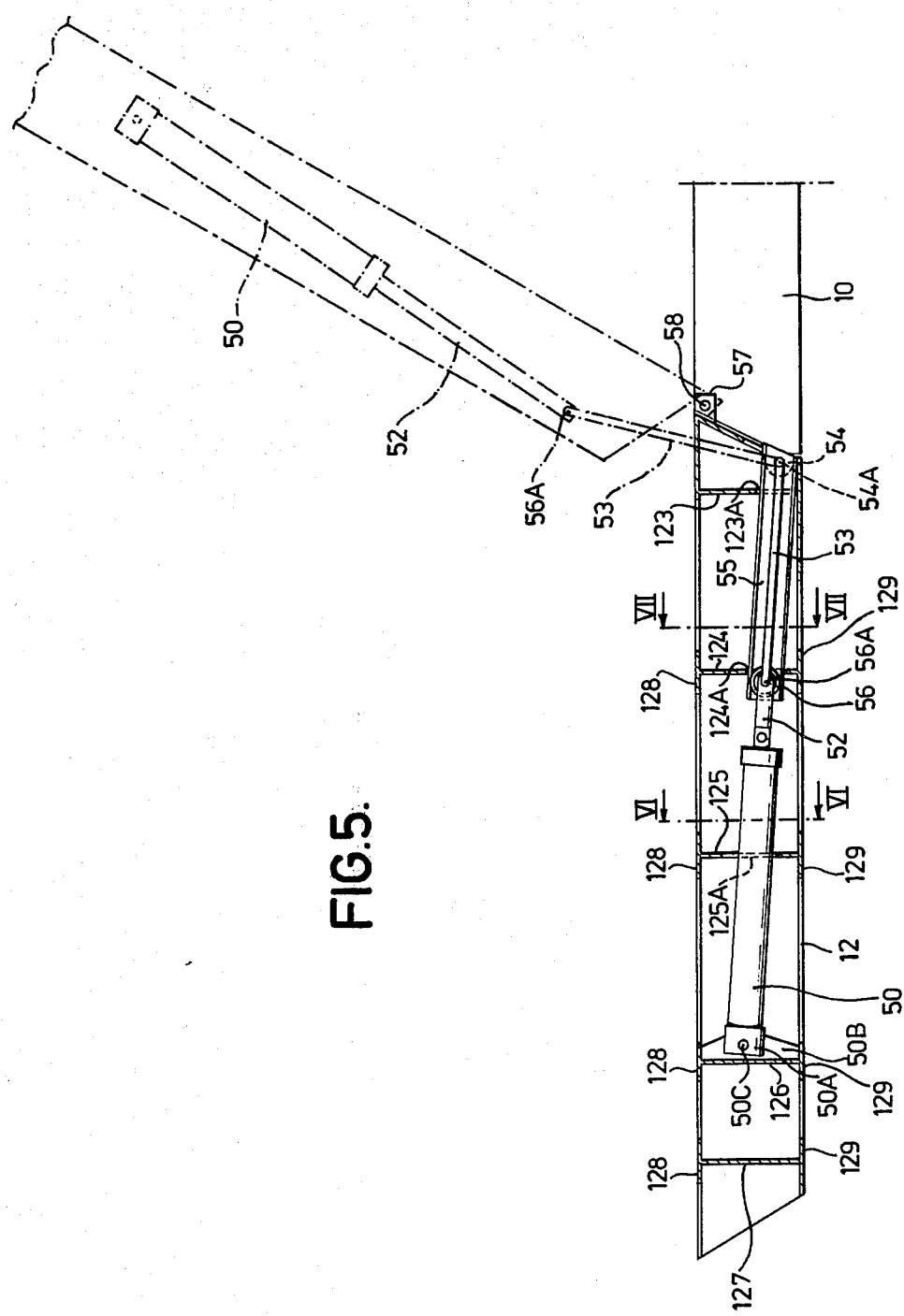
FIG. 5 is a diagrammatic, fragmentary, and part sectional view of part of the bolster member and the extension member, illustrating the operative and inoperative positions of the extension member.
Figure 6:
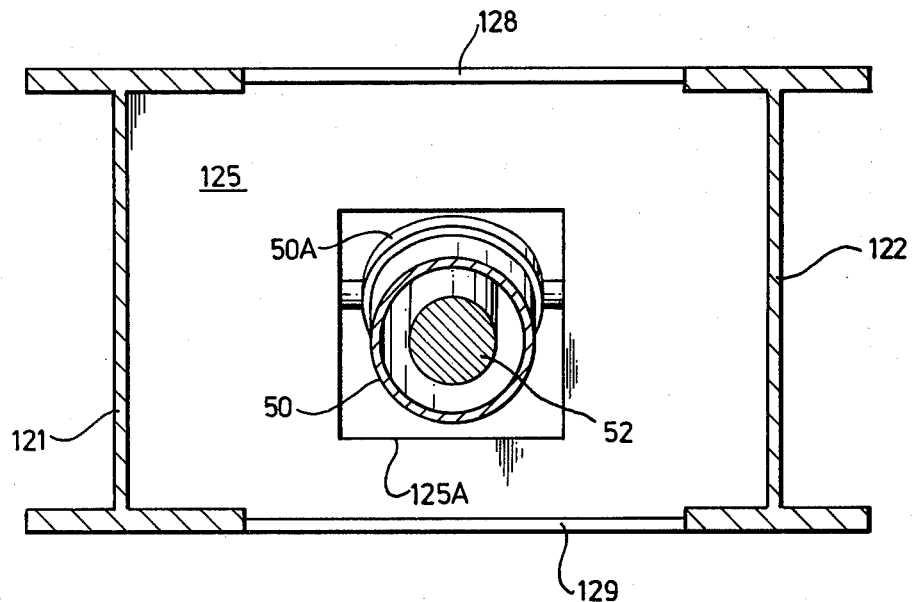
FIG. 6 is a section on the plane VI-VI of FIG. 5.
Figure 7:
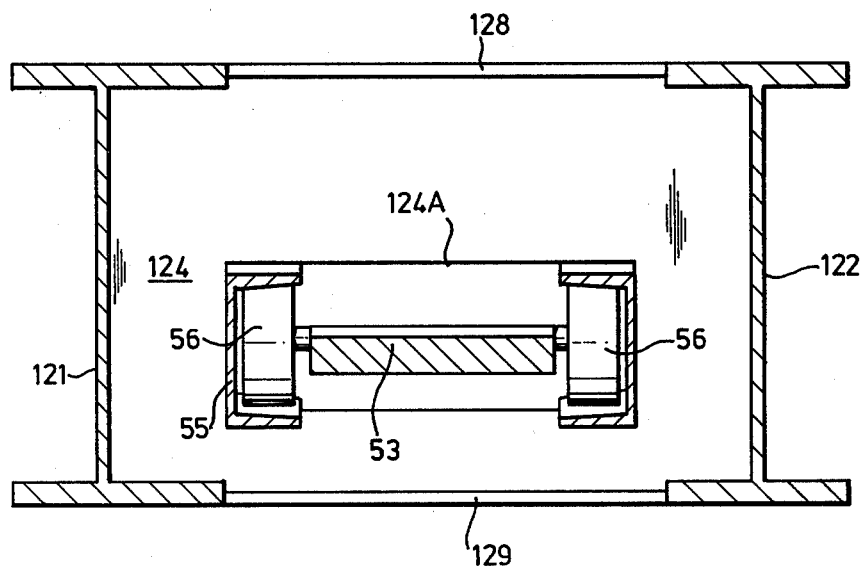
FIG. 7 is a section on the plane VII-VII of FIG. 5.

Referring now to FIGS. 5 to 7, an extension member 12 is shown in more detail. It is fabricated from two I-section girders 121, 122, spaced apart and connected by a series of spaced stiffening web plates 123, 124, 125, 126, 127. These plates are welded to the inner faces of the girders, and the whole has a cross-section at right angles to the length of the extension member which cross-section is rectangular, see FIGS. 6 and 7. For additional stiffening, the web plates 124 to 127 each have upper and lower flanges 128, 129 respectively, which extend transversely of the extension member between the respective flanges of the I-section girders 121, 122.

The extension member 12 has a hinge connection at 58 to brackets 57 of the bolster member 10, so that the member 12 swings upwardly and downwardly about point 58 between its operative and inoperative positions.

The hydraulically-actuated linkage will now be described.

An extendable, contractable hydraulic ram includes a ram cylinder 50 pivotally mounted at 50C by its head 50A on spaced brackets 50B extending between flanges 128, 129 of web plate 126. The cylinder extends through an aperture 125A in the plate 125, the aperture 125A being generally central in the plate 125. A piston rod 52 extends from the ram cylinder and its free end is connected to a first pivotal connection 56A at one end of an elongate link 53, the other end of which has a second pivotal connection 54A to brackets 54 of the bolster member 10. This pivotal connection 54A constitutes the axis about which the link 53 swings relative to the bolster member 10, and through which thrust is exerted during a first part of the upward swinging movement of the extension member 12.

The first pivotal connection 56A includes a pair of spaced rollers 56 (see FIG. 7) each of which rides in a respective one of spaced, opposed, elongate, channel section guides 55. These guides 55 are mounted by apertures 124A, 123A in the web plates 124, 123.

It will be observed from FIG. 5 that the longitudinal axis of the ram, including the cylinder and piston rod, and also the link 53, extends lengthwise of the extension member 12, and inclined to its length, so that the second pivotal connection 54A is close to the lower side of the rectangular cross-section of the extension member 12, when the latter is in the horizontal operative position. This provides for a sufficient distance between the axes of connections 54A and 58, to allow the required leverage to be exerted in lifting the extension member 12. It will also be observed that the ram and the guides 55 are within the rectangular cross-section of the extension member 12.

In FIG. 5 the inoperative upwardly inclined position of the extension member 12 indicated in dot-dash lines. It will be seen that the included angle between it and the horizontal bolster member 10 is 60°, so that the extension member will traverse 120° in being moved from its operative to its inoperative position. Thus the inoperative position may be in the range of from more than 90° up to 130° to the horizontal.

To move the extension member 12 from operative to inoperative position, the hydraulic linkage is actuated. Fluid under pressure is admitted to the ram cylinder 50, and since the piston rod 52 and link 53 are constrained by the guides 55 and the fixed pivotal connection 54A of the link to the bolster member 10, the cylinder moves away from pivotal connection 56A, so swinging the extension member 12 upwardly around the hinge connection 58.

During the first part of this swinging upward movement it will be understood that the link 53 is under compression. When however the extension member has moved through about 90°, it swings past the vertical, and in a second part of its swinging movement its weight causes it to swing to the inoperative position seen in FIG. 5, and also in FIG. 2. In this second part of the swinging movement therefore, the link 53 will be under tension, and not under compression. It will be noted that the arrangement of the parts ensures in a simple manner that the link 53 does not foul the end of the bolster member either during the swinging movement or in the inoperative position. Further it will be noted that in the operative position the underside of the extension member is free of projections which might otherwise foul a truck or a wagon in position below the extension member for transfer of a load.

I claim:

1. A vehicle-mounted crane assembly comprising:
   (i) a vehicle frame having a longitudinal axis;
   (ii) an elongate bolster member extending transversely to the vehicle frame and supported thereby;
   (iii) an elongate extension member;
   (iv) a hinge connection between the extension member and an end of the bolster member mounting the extension member for swinging movement in a plane transverse to the said longitudinal axis between a horizontal operative position aligned with the bolster member; and an inoperative upwardly inclined position in excess of 90° and up to 130° relative to the horizontal;
   (v) an adjustable leg structure carried by the outer end of the extension member for engagement with the ground when the extension member is in the horizontal operative position;
   (vi) a pedestal supported by the bolster member and mounted for traversing movement along the bolster member and along the extension member when the latter is in the horizontal operative position;
   (vii) lifting means supported by the pedestal for attachment to a load to be raised or lowered relative to the vehicle frame;
   (viii) a hydraulically-actuated linkage for swinging the extension member relative to the bolster member between the operative and inoperative positions of the extension member,
   wherein the linkage comprises:
   (a) an extendable, contractable hydraulic ram mounted by the extension member, the longitudinal axis of the ram extending lengthwise of the extension member, and the ram having a piston rod with a free end;
   (b) an elongate link having a first pivotal connection at one of its ends to the free end of the piston rod and having a second pivotal connection at the other of its ends to the bolster member for swinging of the link about a fixed axis;
   (c) elongate guide means mounted by the extension member for guiding the said first pivotal connection; and
   (d) whereby during a first part of the swinging movement of the extension member from the horizontal operative position to the inoperative upwardly inclined position, the elongate link is in compression until the extension member has been raised to a position in which its weight, during a second part of the swinging movement, causes a force reversal so that the elongate link is in tension.

2. An assembly as defined in claim 1 wherein the cross-section of the extension member at right angles to its length is rectangular, the hydraulic ram and the elongate guide means being mounted within the rectangular cross-section.

3. An assembly as defined in claim 2 wherein the elongate guide means and the longitudinal axis of the ram are inclined to the length of the extension member such that the said second pivotal connection is close to the lower side of the said rectangular cross-section when the extension member is in its horizontal operative position.

4. An assembly as defined in claim 3 wherein the extension member includes at least one rectangular stiffening web plate, which plate is at right angles to the length of the extension member and has a generally centrally disposed aperture through which the ram extends.

5. An assembly as defined in claim 4 wherein the extension member includes at least one further rectangular stiffening web plate, which further plate is at right angles to the length of the extension member and has an aperture through which the elongate guide means extend.

6. An assembly as defined in claim 1 wherein the pedestal is vertically extendible.

7. An assembly as defined in claim 1 wherein the end of the bolster member opposite the extension member is provided with a retractable leg which is hinged to the bolster member such that the retractable leg can be swung to a forward or rearward position in which it does not project laterally beyond the vehicle.

8. An assembly as defined in claim 1 wherein the bolster member includes rails, the pedestal being mounted on a carriage having wheels engaging the rails, and drive means for traversing the carriage along the rails, the drive means including a motor mounted on the pedestal.

9. An assembly as defined in claim 1 wherein the adjustable leg structure comprises a leg or strut of which is of right-angular form and is so mounted on the extension member that it increases the effective length of the extension member whereby the latter can span or straddle a truck or other vehicle.

* * * * *